United States Patent
Bradford

(10) Patent No.: US 10,726,440 B1
(45) Date of Patent: Jul. 28, 2020

(54) SYSTEM AND METHOD FOR EXECUTING CONSUMER TRANSACTIONS BASED ON CREDENTIAL INFORMATION RELATING TO THE CONSUMER

(75) Inventor: David K. Bradford, San Rafael, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1003 days.

(21) Appl. No.: 11/934,578

(22) Filed: Nov. 2, 2007

(51) Int. Cl.
 *G06Q 30/02* (2012.01)
 *G06Q 40/02* (2012.01)

(52) U.S. Cl.
 CPC ..... *G06Q 30/0237* (2013.01); *G06Q 30/0269* (2013.01); *G06Q 40/02* (2013.01)

(58) Field of Classification Search
 CPC . G06Q 30/0251–0271; G06Q 30/0237; G06Q 30/0269; G06Q 40/02
 USPC ...................................... 705/26, 27
 See application file for complete search history.

(56) References Cited

U.S. PATENT DOCUMENTS

| 6,857,073 B2 * | 2/2005 | French et al. ............... 713/168 |
| 7,577,609 B1 * | 8/2009 | Maher ............................ 705/39 |
| 2001/0014868 A1 * | 8/2001 | Herz et al. ...................... 705/14 |
| 2002/0004900 A1 * | 1/2002 | Patel ............................. 713/155 |
| 2002/0103999 A1 * | 8/2002 | Camnisch ........... G06Q 20/383 713/155 |
| 2003/0037233 A1 * | 2/2003 | Pearson ........................ 713/156 |
| 2007/0255619 A1 * | 11/2007 | Ekchian ......................... 705/14 |
| 2008/0319836 A1 * | 12/2008 | Aaltonen et al. ............... 705/10 |
| 2009/0024462 A1 * | 1/2009 | Lin ................................. 705/14 |

OTHER PUBLICATIONS

Montgomery et al., "Prospects for Personalization on the Internet", Oct. 2007. (Year: 2007).*

* cited by examiner

*Primary Examiner* — Eric T Wong
(74) *Attorney, Agent, or Firm* — Norton Rose Fulbright US LLP

(57) ABSTRACT

Systems and methods are provided for allowing a merchant to provide a consumer with a real-time, personalized offer to execute a consumer transaction in response to evaluating that consumer's credential information. The consumer provides the credential information while, or just before, the consumer selects items to purchase from the website. The credential information provided by the consumer can be a compilation of different information associated with the consumer and may take the form of a score. According to one embodiment of the present invention, a merchant receives credential information relating to a consumer, while the consumer is at that merchant's website. The merchant evaluates the credential information while the consumer remains at the website and makes a real-time personalized offer of goods, services or pricing based at least in part on that evaluation.

9 Claims, 3 Drawing Sheets

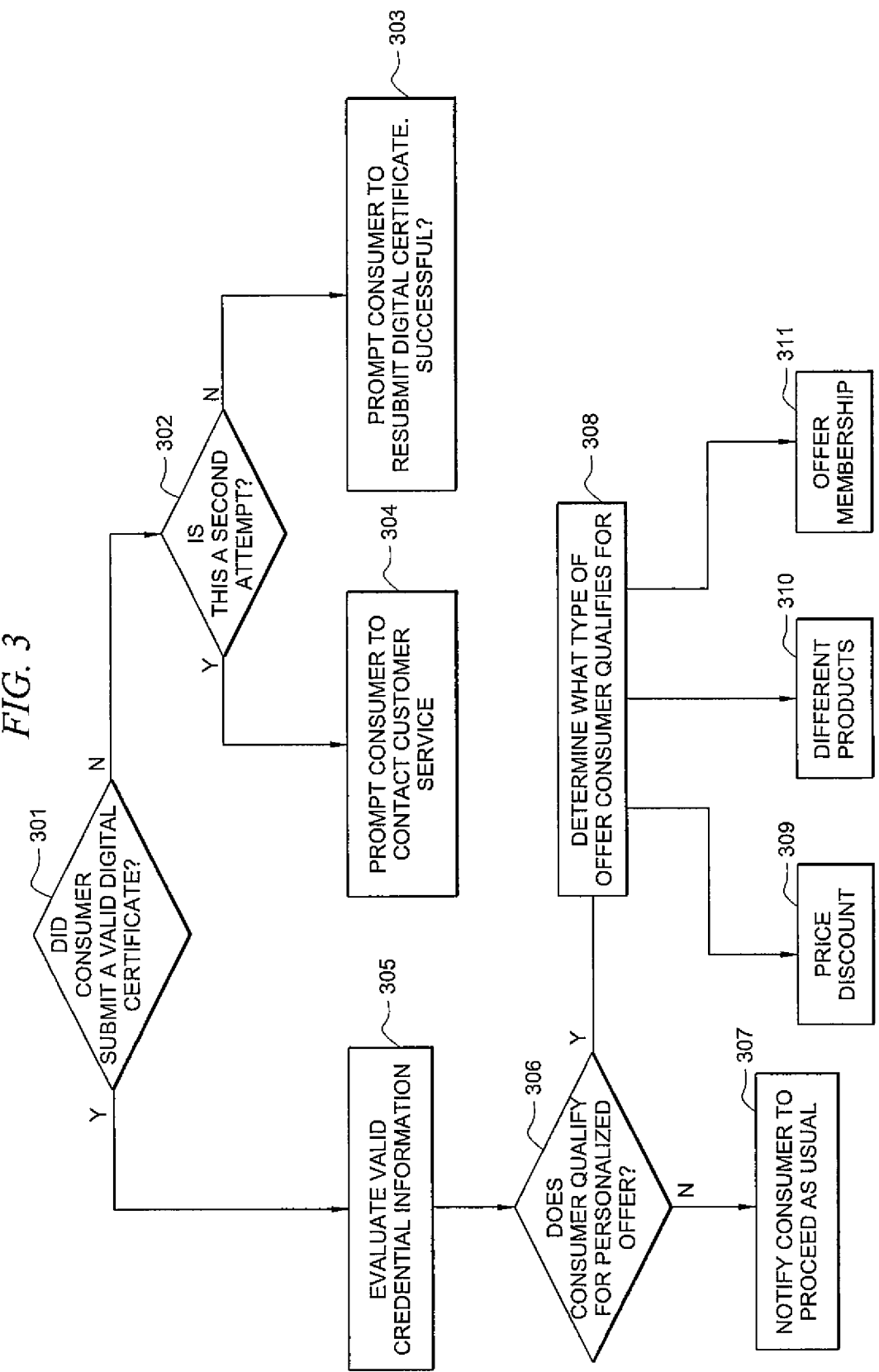

SYSTEM AND METHOD FOR EXECUTING CONSUMER TRANSACTIONS BASED ON CREDENTIAL INFORMATION RELATING TO THE CONSUMER

TECHNICAL FIELD

The present invention relates to consumer transactions. More specifically, the present invention relates to consumer transactions where credential information relating to the consumer affects the terms of the transaction itself.

BACKGROUND OF THE INVENTION

A consumer's credential information, such as indicators of financial responsibility, financial capacity, financial affluence, financial risk, etc., affect what products or services a consumer is likely to purchase, and this in turn affects what offers the merchant should offer in the first place. For instance, a consumer with low financial risk and high financial affluence credentials would be more willing to consider a more expensive set of products than would a consumer with high debt and little ability to pay for the products or services. Merchants, particularly online merchants, are limited in their ability to make personalized, real-time offers to specific groups of consumers. This limitation arises from the fact that merchants usually cannot ascertain financial credential information relating to the consumer until after a transaction is complete.

When a consumer visits a merchant's website, e.g., amazon.com, that merchant cannot ascertain credential information relating to the consumer and thus, the merchant is unable to distinguish the financial capacity of one consumer from the financial capacity of another consumer. As a result, online merchants must provide the same product or service offerings to every consumer, regardless of the financial status of that consumer.

Currently, an online merchant must infer from information, such as the web sites recently visited by the consumer (e.g., as determined by cookies placed on the computer) or demographic information provided by the consumer, and the like, to predict what a consumer's financial credentials might be. As a result, an online merchant is forced to infer that a consumer has a given purchase capacity. In any event, this methodology is somewhat unreliable because the information associated with the consumer is not validated. For example, the consumer could provide false demographic or financial information in response to a question. This mechanism is especially inaccurate when more that one individual uses the computer within a household. This presents a less than ideal method of effectively targeting preferred consumer groups.

By way of analogy, suppose a potential buyer visits a car dealership. The car salesperson, by observation, determines that the potential buyer holds title to a very expensive car. By observing the potential buyer's title to the car, the salesperson is able to view validated information that provides an indication of that consumer's purchasing capacity. Accordingly, the salesperson can make decisions as to the likelihood that that particular purchaser will potentially buy one car over another. Thus the sales pitch and sales offers can be tailored to the individual consumer. In this example, the salesperson would be motivated to make personalized offers to preferred consumers based upon a perception the salesperson has of the customer. That is, the potential buyer's car is an indication of that buyer's financial capacity. Given this information, the car salesperson increases the likelihood of acquiring a preferred customer while reducing the likelihood of acquiring a less profitable customer, or even worse, wasting time dealing with a consumer that will not financially qualify to make a purchase in the first place.

The situation described above does not readily apply to the virtual world of on-line shopping. That is, online merchants cannot readily ascertain validated credential information relating to consumers visiting its website. As such, an online merchant must provide the same offers and present the same merchandise or service to every potential consumer.

SUMMARY OF THE INVENTION

Systems and methods are provided for allowing a merchant to provide a consumer with a real-time, personalized offer to execute a consumer transaction. The offer is made in response to evaluating that consumer's validated credential information, which is provided to the merchant by the consumer. The consumer provides the validated credential information while, or just before, the consumer selects items to purchase from the merchant. The validated credential information provided by the consumer can be a compilation of different information associated with the consumer, and may take the form of a score.

According to one embodiment of the present invention, a merchant receives validated credential information relating to a consumer while the consumer is at that merchant's website. The merchant evaluates the validated credential information while the consumer remains at the website and makes a real-time personalized offer of goods, services, or pricing based at least in part on that evaluation. According to the embodiment, the personalized offer could include offering otherwise unavailable products or changing the layout of the website itself.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 depicts a decision making process executed by a merchant according to an embodiment of the present invention.

DETAILED DESCRIPTION OF THE PREFERRED EMBODIMENT

Figure 1:
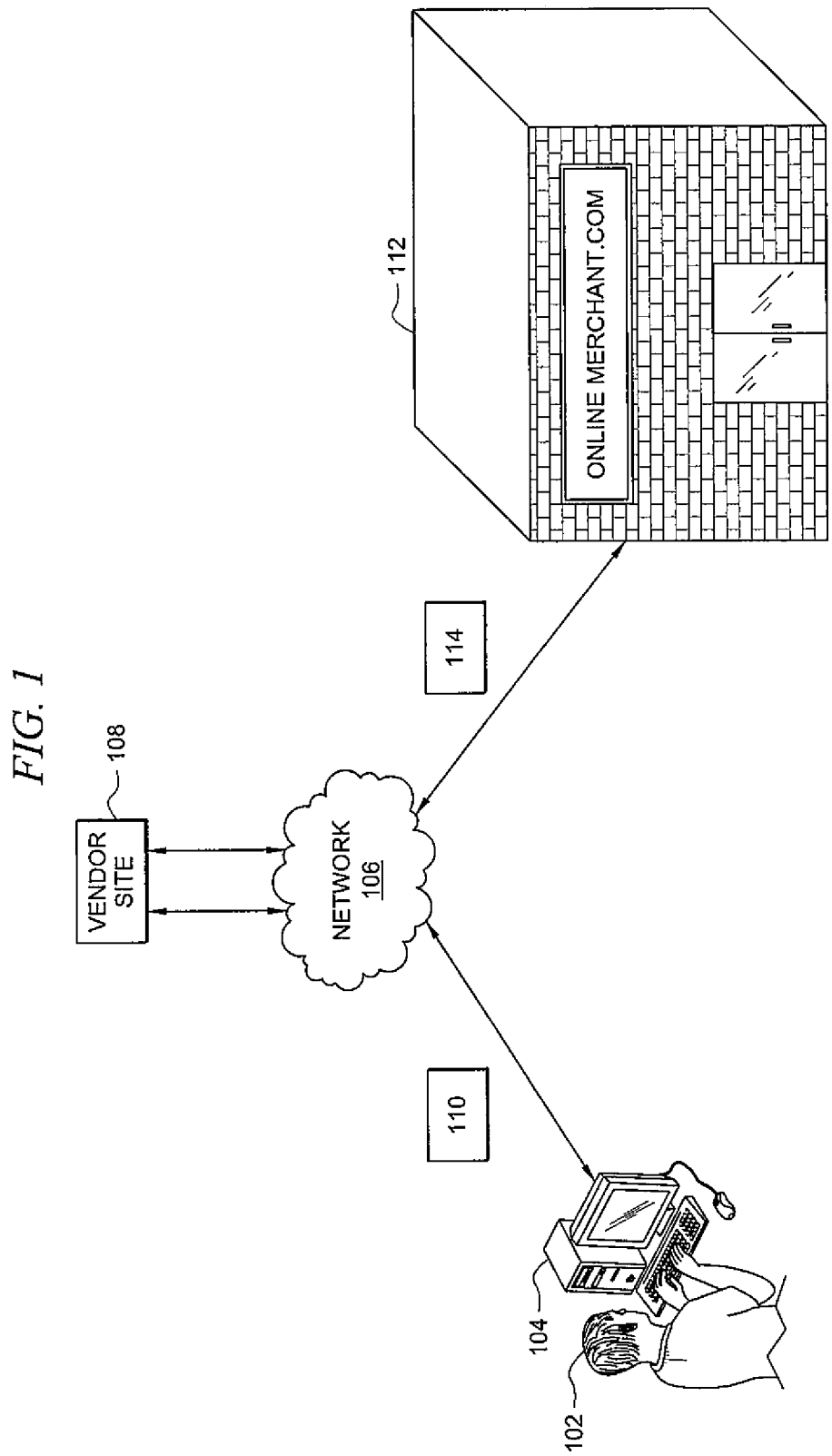
FIG. 1 depicts a system according to an embodiment of the present invention.

FIG. 1 depicts a system, such as system 100, for executing a consumer transaction according to an embodiment of the present invention. Consumer 102, by utilizing personal computer 104, is able to access various websites over network 106. Network 106 can be an internet network having a number of configurations comprising LAN, WAN, T1, T3, and DSL segments, etc.

User 102 navigates to vendor site 108 to obtain digital certificate 110. As will be discussed in greater detail, digital certificate 110 contains credential information relating to consumer 102 and is utilized to effectuate future consumer transactions where consumer 102 receives special or personalized offers. Vender site 108 can be a number of websites, e.g., myfico.com, that are envisioned as being able to provide and validate credential information to be utilized by consumer 102 in exchange for a personalized offer. Information contained in digital certificate 110 can represent a compilation of different types of information, and can include of a score and can be stored, in digital encrypted format, on computer 104. Notably, digital certificate is effective insomuch as the information contained therein has been verified by a third party. As a result, a merchant can rely on the notion that the information is accurate when making a personalized offer based on that information.

It should be appreciated that consumer 102 can receive digital certificate 110 in the form of a card from vendor site 108. It should also be appreciated that consumer 102 can copy digital certificate 110 from computer 104 to a portable medium, such as to a flash memory card. According to such embodiments, consumer 102 is able to carry digital certificate 110 with him/her when he/she visits a store. In such situations, the consumer will manually provide digital certificate 110 to a merchant.

In one embodiment, merchant 112 visits vendor site 108 to obtain membership 114. Merchant 112 uses membership 114 to participate in a program that allows merchant 112 to make real-time, personalized offers to consumers based on consumer credential information. As such, membership 114 may involve merchant 112 downloading software or obtaining a subscription, and the like. In any event, once merchant 112 obtains membership 114, merchant 112 can advertise to consumers that it makes offers based upon consumer credential information. This, of course, prompts a consumer to submit credential information in exchange for a personalized offer.

Consumer 102 visits a website associated with merchant 112 and can begin selecting items for purchase. While doing so, consumer 102 notices that merchant 112 has obtained membership 114 and participates in the program described above. Accordingly, consumer 102 submits digital certificate 110 to merchant 112, thereby providing merchant 112 with his/her credential information. As will be discussed further, in the embodiment being discussed merchant 112 is not able to ascertain personal identity information simply because consumer 102 provides digital certificate 110 to merchant 112. That is, merchant 112 cannot determine the personal identity of consumer 102 at this point. Instead, merchant 112 can only ascertain a financial credential score associated with that consumer.

Once merchant 112 receives the credential information of consumer 102, it executes a decision-making process to determine what personalized offers, goods or services, if any, are to be made to that consumer. As described below, the decision-making process executed by merchant 112 is highly unique and will depend on each merchant's specific business plan. Once the decision-making process is complete, merchant 112 makes a personalized offer to consumer 102.

The extent to which the offer is personalized, and the manner in which the offer is personalized may vary widely. For example, merchant 112 might make a subtle change, such as simply offering a price discount. On the other hand, merchant 112 might highly personalize an offer by, for example, changing the website layout, offering products that were not otherwise available, offering special payment plans, presenting membership opportunities, and the like. For instance, merchant 112 might evaluate the consumer's credential information and determine that consumer 102 is most interested in products having a relatively high price point. In such case, merchant 112 would present those products having a higher price-point than those originally presented. Of course, this is possible as the consumer credential information will often provide an indication of a consumer's ability to pay for products having a high (or low) price point, or in other words, an indication of a consumer's immediate ability and or inclination to pay for premium products or services. The indication may be represented by information such as the consumer's purchase history, credit history, financial capacity, and the like. Further, such information can be combined with other currently available information such as the consumer's residence, occupation, shopping preferences, etc.

It should be appreciated that consumer 102 is not required to select items for purchase from merchant 112 online. Rather, consumer 102 can visit a store associated with merchant 112 and, as discussed earlier, provide a digital certificate manually. Likewise, merchant 112 can make a personalized offer to consumer 102 on a face-to-face basis.

Figure 2:
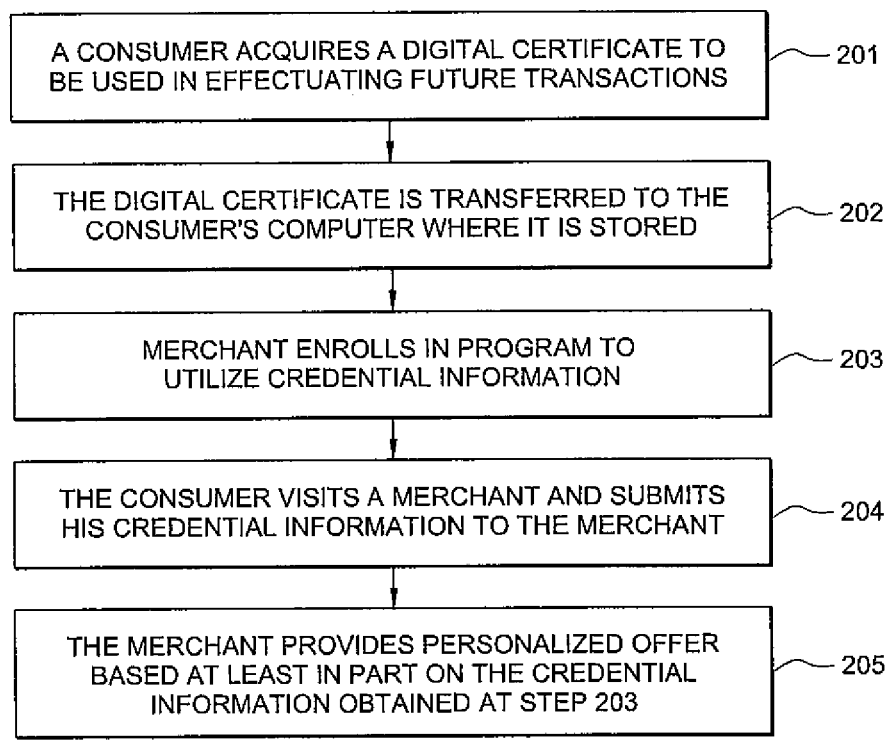
FIG. 2 depicts a method of operating the system shown in FIG. 1 according to an embodiment of the present invention.

Turning to FIG. 2, a method for executing consumer transactions according to an embodiment of the present invention is depicted as method 200. Process 201 allows a consumer to acquire a digital certificate to be used in effectuating future transactions. A consumer can obtain a digital certificate in a number of ways via the internet or other means known in the art. Embodiments are envisioned where a consumer can visit myfico.com and purchase a FICO webscore or a derivation thereof, of course a number of websites may be available to provide a digital certificate.

Process 202 returns to the consumer an encrypted, secure digital certificate for storage, for example, on the consumer's computer. The digital certificate may contain various combinations of information relating to the consumer. According to the shown embodiment, the digital certificate contains a unique identifier that is specific to the consumer, a time stamp, and a partial credit card number of one or more credit cards. As will be discussed hereinafter, the partial credit card numbers help the merchant in verifying the consumer's identity while a transaction is being executed. The unique identifier serves to associate the digital certificate with the consumer. However, the unique identifier does not identify the consumer. That is, one cannot determine the personal identity of the consumer simply by knowing the unique identifier.

Further, the digital certificate may contain a score based on a number of combinations of information associated with the consumer. According to the shown embodiment, the score comprises information that indicates the consumer's immediate ability to pay for products within a particular price-point range. That is, the score may provide a very strong indication that a consumer is immediately able to pay for relatively expensive products. Likewise, the score may represent a combination of qualities such as consumer residence, vehicle ownership, occupation, purchase history, shopping preferences, and the like. In other cases, the score may be an indication of the level of risk that a consumer presents, e.g., consumer financial risk, credit history, credit score, net worth, income tax information, and the like. Also, ins some cases the digital certificate may contain more than one score, where the scores can be updated to reflect changes in relevant information relating to the consumer, i.e., updates may reflect changes in the consumer's financial capacity. While the composition of each score contained in the digital certificate may be unique to other scores, each score is meant to provide utility to a merchant in making better decisions relating to offers provided to the consumer. In any event, the score is advantageous as the information represented therein is validated information. For instance, the information is not provided by the consumer himself, but an unbiased third party.

The specific score, and its components, can be calculated using, for example, propriety algorithms and are likely to vary according to the applications for which the consumer will use the digital certificate. The digital certificate may contain more or less than the information described above, depending on the particular transactions to be executed by the consumer.

The digital certificate is stored so that it can be retrieved when needed to provide credential information to merchants at a later time. In some cases, the digital certificate can be stored on a portable storage media, e.g., a smart media card, mobile phone, or credit/debit-type card. In such case, a consumer could swipe the card online where needed or use the stored data when visiting a store, thereby informing a merchant as to his/her credential information. Also, a consumer's digital certificate could be transferred to a third party. The third party would be responsible for maintaining the consumer's digital certificate so that it can be retrieved when needed to execute a transaction.

At step 203 a merchant enrolls in a program that allows that merchant to utilize the consumer's digital certificate. Step 203 may occur before, after, or during steps 201 and 202. Also, step 203 may include downloading software that enables the merchant to utilize the digital certificate and/or communicate with a third party that maintains the consumer's digital certificate. Step 206 may also involve obtaining a subscription, executing a licensing agreement, and the like. Accordingly, the merchant is able to read the encrypted digital certificate and utilize the credential information relating to the consumer.

Process 204 allows a consumer to visit a merchant's website and present his/her credentials. The online merchant could provide a mechanism to notify online consumers that it participates in the program or the consumer could simply try to use his/her credentials. For example, the online merchant may display a symbol or advertisement that recites, for example, "we read the FICO web score to provide personalized offers based on the score." Of course, as will be readily apparent to those skilled in the art, any number of mechanisms can be employed to let the consumer know the online merchant participates in the program.

Once the consumer submits his/her credential information to the merchant, the merchant provides under the control of process 205 special incentives, goods and/or services that may not otherwise be provided. As previously mentioned, the level of personalization of the offer will depend on the credential information itself and/or the merchant's business model. That is, the level of personalization could be subtle, e.g., a custom payment plan, or very significant, e.g., presentation of a new product layout. Analogously, where a consumer visits a merchant, e.g., at a shopping mall, a consumer can visit the store and manually provide his/her digital certificate. As mentioned above, a consumer could provide his/her credential information by a number of means, including swiping a card having the information, inserting a storage media into a reader, placing a phone call, etc. In response, a merchant could direct the consumer to special offers that he/she qualifies for in view of this credential information.

When the consumer provides the certificate, the online merchant reads the certificate, examines the merchant's policies or some set of predetermined standards, and returns a personalized, real-time offer to that consumer. As mentioned, examples of such real time, personalized offers are price discounts, a particular payment plan, opportunities to purchase otherwise unavailable products or services, offers of membership to preferred groups, etc. Of course, the metrics used to classify a consumer's credentials as good, bad, average, etc. can be different, depending upon the "target consumer" of the online merchant.

In some cases, the merchant may not need the certificate until check-out. However, there is no requirement that a merchant wait until a consumer is ready to check out before making a personalized offer. For instance, the merchant can read a potential consumer's credential information before the consumer actually moves to check out selected items. In such case, the online merchant can tailor the website according to the credential information by, for example, presenting the consumer with more expensive items, a broader range of items, a wider range of purchasing options, or may be presented with a distinct layout. As can be easily seen, a merchant store owner could similarly present a customized scheme to a visiting consumer. The personalized offer is made in real-time so that the transaction can continue in seamless fashion. Moreover, a consumer is free to delete or block access to the digital certificate to prevent a merchant from having access thereto.

As mentioned above, a consumer's digital certificate contains a unique identifier that is associated with that consumer. However, one cannot determine the personal identity of the potential consumer. As such, the merchant cannot ascertain personalized information relating to the consumer, i.e., consumer name, address, occupation, etc. until the transaction is complete. At the moment the digital certificate is read, the consumer remains anonymous. This feature protects the consumer's privacy and avoids sharing sensitive information.

FIG. 3 depicts a decision making process executed by a merchant according to an embodiment of the present invention. In the preferred embodiment, the merchant executes decision-making process 300 in response to an attempt by a consumer to submit credential information. Alternatively, process 300 may automatically begin where a merchant automatically searches for, and then reads, an available digital certificate associated with the visiting consumer. Process 301 determines if the consumer has submitted a valid digital certificate. If merchant cannot determine that the submitted digital certificate is valid, or cannot otherwise read the digital certificate, then process 302 determines whether a subsequent attempt is being made, Process 303 prompts consumer to resubmit the digital certificate. If the second attempt is unsuccessful, process 304 to handles the consumer, perhaps by directing the consumer to an operator.

When a valid certificate is reviewed, process 305 causes the merchant to evaluate the validated credential information. The evaluation may involve comparing the credential information to the merchant's policies or some other metric. Process 306 determines whether the consumer qualifies for a personal offer in view of the evaluation performed by process 306. If the consumer does not qualify, process 307 notifies consumer to continue shopping as usual.

However, if the consumer does qualify for a personal offer, process 308 determines what type of personalized offer should be provided. By way of example, the merchant can offer a price discount under control of process 309, or offer a wider range of products or services via process 310, or offer a preferred membership via process 311.

According to embodiments disclosed herein, consumers can utilize credential information, compiled in the form of a score, to execute preferred, real-time transactions. Real-time generally means the time during which a consumer visits a merchant's website or visits a merchant's store. Although real time includes instantaneous transactions, it is not limited to such.

Consumers can use good credentials, e.g., good creditworthiness, to strike better bargains and extend their credentials to be used as leverage in a wide-range of different transactions. Also, merchants can view a consumer's validated credential information before deciding what offers to provide to that consumer. By utilizing systems and methods described herein, a merchant can make its website or store "customer centric" by providing unique offers based upon a consumer's credential information. Merchants are also able to collect promotional response data and determine optimal pricing points and response behavior of different segments of consumers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of using a credit checking computer system at a merchant store that executes a consumer transaction while keeping the consumer's identity secure to customize a website associated with a merchant and present a personalized, real-time offer to the consumer, said method comprising:

prompting, by the credit checking computer system at the merchant store, the consumer to connect a portable storage medium to the credit checking computer system at the merchant store;

receiving, at said credit checking computer system at said merchant store, an encrypted digital certificate from the portable storage medium, said encrypted digital certificate having been created by a third party vendor and including information validated by said third party vendor, said validated information comprising a unique consumer identifier and said consumer's credit score, while maintaining the consumer's anonymity;

utilizing, by said credit checking computer system at said merchant store, said information validated by said third party vendor and received in said encrypted digital certificate from said portable storage medium to determine an indication of said consumer's credit score;

comparing the determined consumer's credit score to a policy set by said merchant for making personalized offers, said policy stored in memory connected to said credit checking computer system at said merchant store;

based upon said comparing, determining (1) that the consumer qualifies for one or more offers according to said policy, and (2) an extent to which the offer is to be personalized according to said policy; and customizing the website to present, via said credit checking computer system at said merchant store, the one or more offers to said consumer to purchase products or services based on the comparison of the merchant's policy to the consumer's credit score;

wherein the customizing is based on the extent to which the offer is personalized according to said policy, and comprises presenting the consumer with a distinct website layout in real time or near-real time and at least one of: presenting the consumer with items in a certain price range, presenting said consumer with a broader range of items, and presenting said consumer with a certain range of purchasing options.

2. The method of claim 1, wherein said consumer's credit score is stored to said portable storage medium by said third party vendor at the request of said consumer.

3. The method of claim 2, wherein said encrypted digital certificate is obtained by said consumer from a location of the third party vendor.

4. The method of claim 1, further comprising receiving an updated encrypted digital certificate from the third party vendor relating to said consumer in response to a subsequent validation performed by said third party vendor, wherein the updated encrypted digital certificate updates the consumer's credit score.

5. The method of claim 1, wherein said credit score is provided by said third party vendor while said consumer is on line with said third party vendor.

6. The method of claim 1, wherein said offer is provided to said consumer while said consumer is viewing the website.

7. The method of claim 1, wherein said offer is provided to said consumer while said consumer is at said merchant store.

8. The method of claim 1, wherein said encrypted digital certificate does not provide identity of said consumer to said merchant.

9. A merchant credit checking computer system for customizing a website associated with a merchant to present a personalized, real-time offer to a consumer comprising:

at least one processor; and a memory coupled to the at least one processor, wherein the at least one processor is configured to:

receive, from a consumer's portable storage medium, a digital certificate having been created by and loaded onto the portable storage medium by a third party vendor, where the digital certificate includes credential information comprising a unique consumer identifier and the consumer's credit score, while maintaining the consumer's anonymity;

validate said credential information received from said portable storage medium;

analyze said credit score received from said portable storage medium in combination with at least one policy set in said merchant credit checking computer system to determine whether one or more offers is available to said consumer to purchase products or services;

determine whether the one or more offers is available to said consumer to purchase products or services, wherein which of the one or more offers is available depends on the policy set in said merchant credit checking computer system as compared to the consumer's credit score;

determine an extent to which at least one or more offer determined to be available to said consumer to purchase products or services is to be personalized based on the policy set in said merchant credit checking computer system; and customize the website to present, to the consumer, the at least one or more offer in real-time that is determined to be available to said consumer to purchase products or services, wherein the customization of the website is based on the extent to which the offer is personalized according to said policy, and comprises presenting the consumer with a distinct website layout in real time or near-real time and at least one of: presenting the consumer with items in a certain price range, presenting said consumer with a broader range of items, and presenting said consumer with a certain range of purchasing options.

* * * * *